Figure 2:
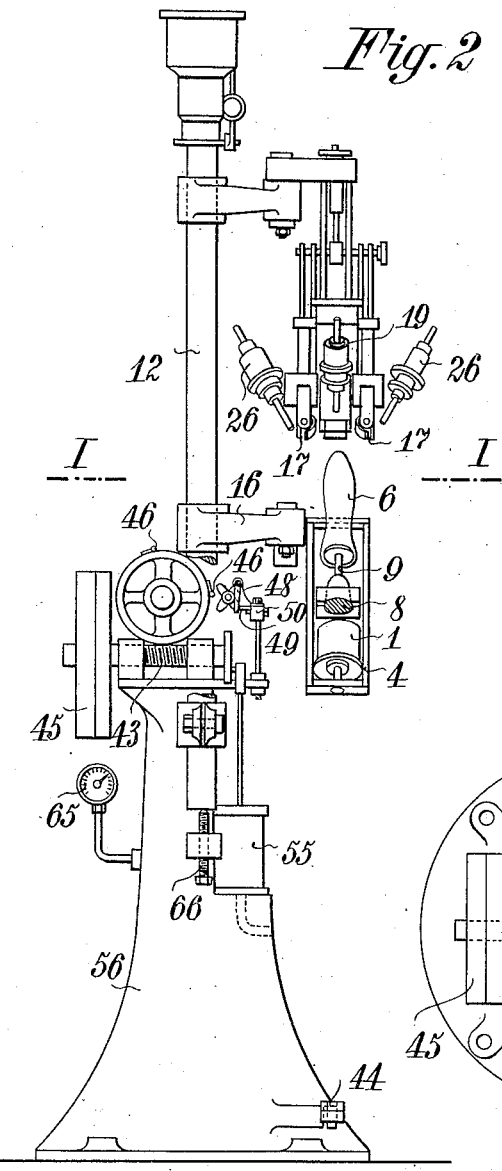

G. PARMENTIER.
SHOE MACHINE.
APPLICATION FILED NOV. 24, 1909.
1,082,704.
Patented Dec. 30, 1913.
5 SHEETS—SHEET 1.
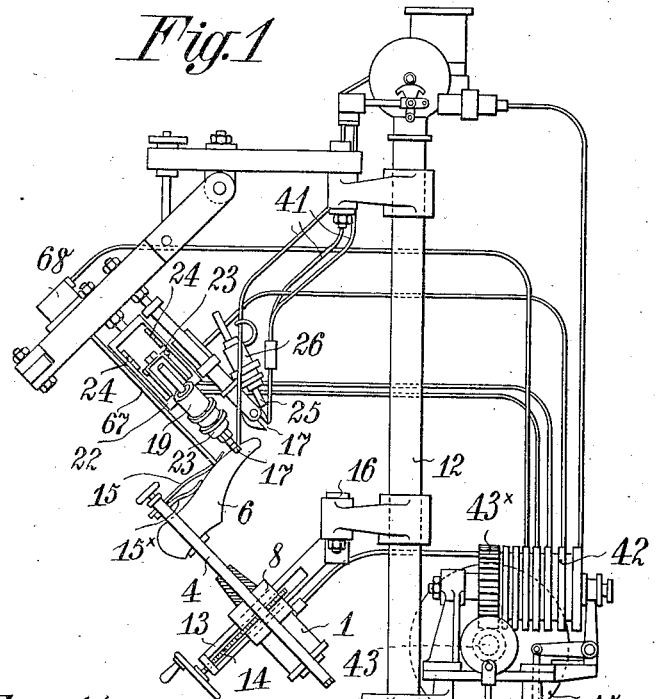
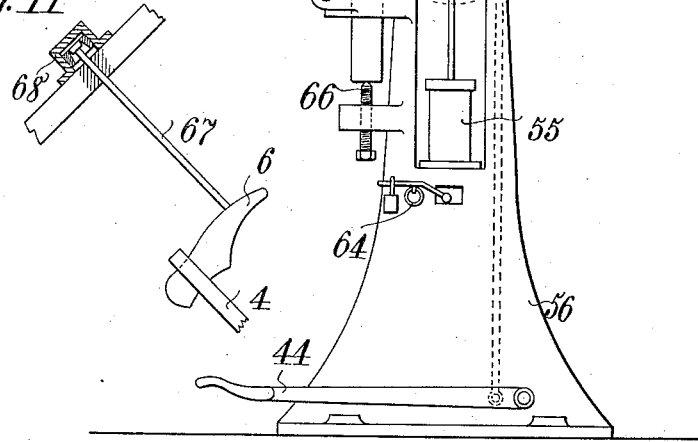
Witnesses:
H. A. Rahn
P. W. Pozzetti
Inventor:
George Parmentier
by Hughes Brown Quimby May
Atty's.

G. PARMENTIER.
SHOE MACHINE.
APPLICATION FILED NOV. 24, 1909.

1,082,704.

Patented Dec. 30, 1913.

5 SHEETS—SHEET 2.

Witnesses:
H. A. Bahn
O. W. Pezzetti

Inventor:
George Parmentier
by Wright Brown Quimby & May
Atty's.

COLUMBIA PLANOGRAPH CO., WASHINGTON, D. C.

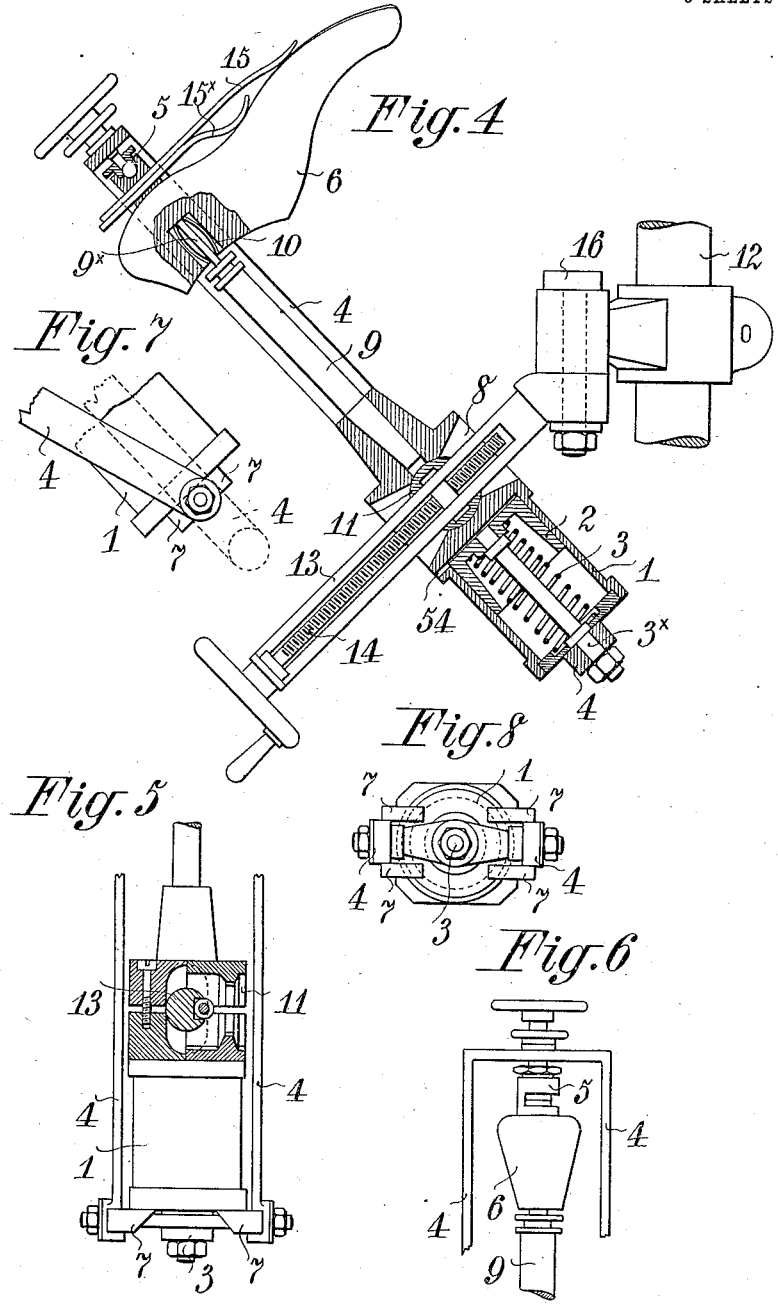

G. PARMENTIER.
SHOE MACHINE.
APPLICATION FILED NOV. 24, 1909.
1,082,704.
Patented Dec. 30, 1913.
5 SHEETS—SHEET 4.
Fig. 10
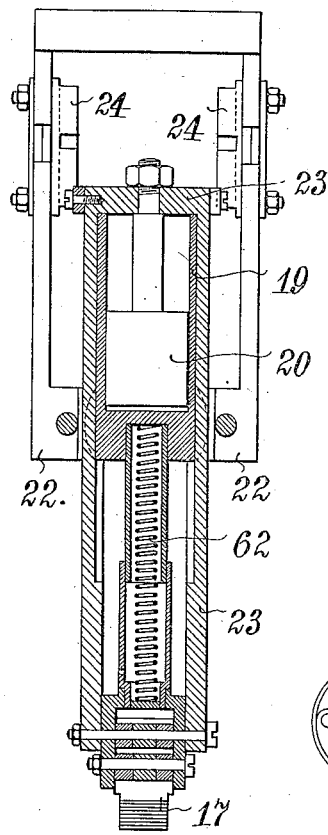
Fig. 9
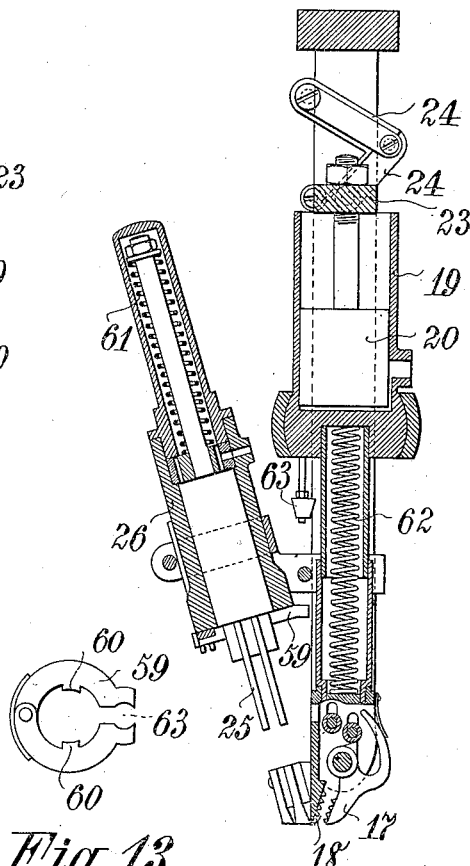
Fig. 13
Witnesses:
H. A. Bahn
P. W. Pezzetti
Inventor:
George Parmentier
by Wright Brown Quinby May
Atty's.

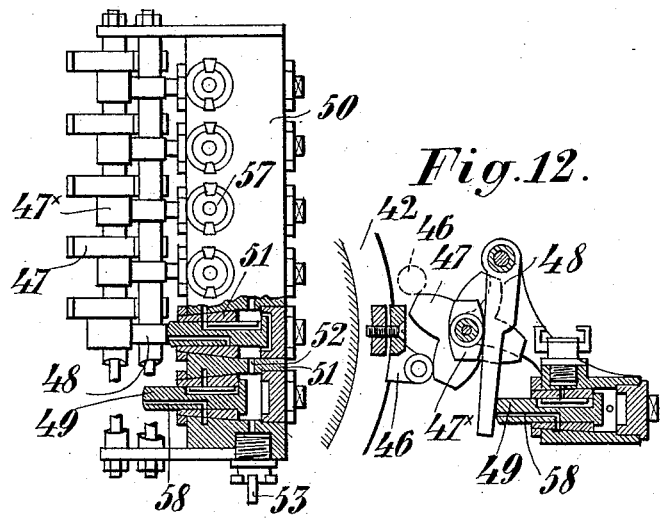

UNITED STATES PATENT OFFICE.

GEORGE PARMENTIER, OF VIENNA, AUSTRIA-HUNGARY, ASSIGNOR OF ONE-HALF TO ANTON STEIN, OF VIENNA, AUSTRIA-HUNGARY.

SHOE-MACHINE.

1,082,704.

Specification of Letters Patent.

Patented Dec. 30, 1913.

Application filed November 24, 1909. Serial No. 529,693.

*To all whom it may concern:*

Be it known that I, GEORGE PARMENTIER, a subject of the German Emperor, residing at 48 Kaiserstrasse, Vienna VII, in the Empire of Austria - Hungary, have invented certain new and useful Improvements in and Relating to Shoe - Machines and the like, of which the following is a specification.

The present invention relates to shoe machines in which the actuation of the tools is produced by a fluid medium, advantageously compressed air.

The invention resides in the fact that all the admission members are arranged side by side in proximity to one another and at a distance from the tools and are or may be united in a valve chest common to them all, the result being that the drive is materially simplified and the tools are exposed freely on all sides and are readily accessible. This arrangement renders it possible so to speak to separate the machine as a whole into two parts independent of each other, one of these parts being constituted by the admission members for the pressure medium and the other part by the tools and tool carrier, which carrier can be rendered adjustable with the tools without affecting the drive itself and the tools can likewise readily be removed from the carrier. The driving of the machine is greatly simplified owing to the fact that all the admission members can be operated by a single automatically operated part of the machine, in addition to which each separate valve is accessible and can consequently be actuated at will.

The invention consists further in a boot and shoe machine comprising a plurality of fluid actuated tools in which the order of the movements of the tools, and, if desired, the time between their successive movements, can be modified as desired and the tools can be thrown out of gear and reëngaged as desired. This is attained owing to the fact that the members for the admission and the discharge of the fluid medium are adapted to be operated at will.

Figure 3:
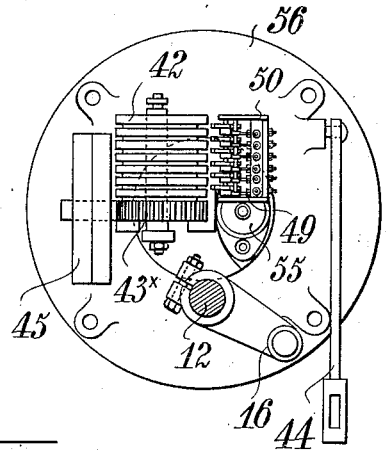

The drawing shows by way of example the construction of the machine as a pull-over machine in Figure 1 in side elevation, in Fig. 2 in front elevation, and in Fig. 3 in sectional plan on the lines I—I in Fig. 2. Figs. 4 to 8 illustrate a clamping device for the lasts, Figs. 4 and 5 being two longitudinal sections perpendicular to each other. Fig. 6 shows the upper part in elevation. Fig. 7 shows the lower part in elevation and Fig. 8 is a plan view corresponding to Fig. 7. Figs. 9 and 10 illustrate a pincers mechanism in two sections at right angles to each other. Fig. 11 shows the valve box with the distributing members in elevation and partial section. Fig. 12 illustrates the valve gear to a larger scale. Fig. 13 illustrates the fixing device for the hammers. Fig. 14 illustrates a detail.

As is known, a pulling-over machine serves to draw the shoe upper over the last and to unite it preliminarily with the inner sole whereby the upper is prepared for the subsequent operation of lasting on the lasting machine. The upper leather is first of all arranged with the lining over the last upon which the inner sole has been placed. The last with the sole upward is then clamped in the clamping device of the pulling-over machine.

In the construction here illustrated, the clamping device consists (Figs. 4–8) of a cylinder 1 and a piston 2, the rod 3 of which is connected with the clamping jaw 5 for the last 6. The arms 4 of the clamping jaw 5 are movable (Figs. 5, 7 and 8) and engage in guides 7 arranged on the cylinder, whereby the result is attained that when the piston 2 moves downward (Fig. 7) the jaw 5 is caused to move above the last. In order to permit of exact adjustment of the clamping device it is both rotatable to right and left and also forward and backward and displaceable.

In the construction illustrated (Fig. 4) the support 9 upon which the last is arranged by means of the last hole 10 is connected with the cylinder 1 by the intermediary of a joint 8. The link bolt 11 of the joint 8 is displaceably mounted on an arm 13 which is rotatably connected with the column 12 of the machine by means of a joint 16. The movement can be effected by means of a screw spindle 14 the nut of which is constituted by the bolt 11 so that when the spindle 14 is rotated the entire clamping device is displaced. By this means it is possible to adjust the last closer to or farther from the tools.

For the purpose of fixing the joint 8 the link bolt 11 is preferably in two parts (Fig. 5) one half being mounted in the cylinder 1, so that when the cylinder moves upward which occurs as a reaction movement upon the descent of the piston, the lower half of the link bolt 11 is pressed on its upper half whereby the arm 13 between the two halves is firmly clamped and the joint consequently fixed. It will of course be understood that the joint can be held in any other convenient manner. Springs 15, 15$^x$ mounted in the jaws can be provided for holding the inner sole upon the last, preferably in such a manner that the spring 15 holds down the inner sole at the toe of the last and the spring 15$^x$ at the arch while the jaw 5 presses the inner sole at the heel. By lateral displacement or by rotation of the jaw 5, the last is exposed and can readily be removed from the machine or lifted from the support 9.

Pincer mechanisms 17 (Figs. 9 and 10) are provided for pulling over the upper leather, each pincer mechanism being arranged on a piston 20 of a cylinder 19, that is to say on the part which is displaced under the influence of the pressure medium. In the construction illustrated, three pincer mechanisms are provided for pulling over the upper leather, one pincer mechanism seizing the leather at the toe of the last and the two other pincers seizing it laterally. As soon as the leather is situated in the jaws 18 in which it is inserted by hand the pincer mechanism is given the necessary movement for stretching the leather over the last, this being effected by admitting the pressure medium (compressed air for example) into the pincers cylinder 19.

The pincer mechanism which pulls the leather over the toe of the last must first of all effect a displacement away from toe of the last thereby stretching the leather. Then the pincers must move toward the middle of the sole in order to arrange the stretched leather over the toe of the last. The pincers which seize the leather on the sides of the last must first of all effect an outward movement and then a movement toward the middle of the sole. In order that these movements may be carried out each pincer mechanism is rockably mounted.

In the construction illustrated in Figs. 9 and 10 the pincers cylinder 19 is rotatably mounted in a bearing 22 on the frame of the machine Fig. 1. The pincer jaws 17 are connected with the piston 20 by means of a yoke piece 23 or the like so that when the piston moves upward the pincer jaws are also lifted. The rocking movement of the pincer mechanism necessary for pulling-over the leather is advantageously obtained by imparting a lateral movement to the piston 20, for which purpose the yoke piece 23 engages in a guide 24 (Figs. 9 and 10) fixed to the machine frame, this guide being formed in such a manner that the pincer mechanism first rocks outward and then toward the middle of the sole. After the leather has been pulled-over it is tacked to the last. The tacks are driven in by hammers 25 which are formed as pistons of cylinders 26. A tack feeding device serves for feeding the tacks.

The opening of the valves is effected by means of any convenient automatically operated part of the machine such for example as a drum 42 (Figs. 1, 3, 11 and 12) upon which tappets 46 or the like are provided (preferably adjustably) for actuating the valves. The actuation of the valves may be produced either directly by the tappets 46 or by the intermediary of intermediate parts 47, 47$^x$, 48, adapted to be readily seized and by rotating which the valves can also be opened by hand if desired, so that any separate tool can be rendered operative at any time and as frequently as required and the fluid medium can flow through the valve passage 58 to the tool cylinders 1, 19, 26, 33, and so forth. In the construction here illustrated the intermediate parts are constituted by cam wheels 47, cams 47$^x$ and levers 48. By rotating one of the cam wheels 47 by hand the cam 47$^x$ connected therewith is rotated, thus actuating the corresponding lever 48 and opening the valve. The lever 48 can likewise be actuated directly by hand, thus opening the valve. The drum 42 may be driven, for example, from the belt pulley 45 by the intermediary of worm gear 43, 43$^x$, the member 43$^x$ of which being adapted to be coupled with the drum 42 to be driven. Connection can be established and disestablished between the worm wheel 43$^x$ and the drum 42 by means of a pedal 44 which is connected by a rod with the axially displaceable drum 42.

The operation of the machine is as follows: As soon as the last with the boot upper pulled over it is clamped, the valve gear for the admission members for the fluid medium is rendered operative.

The opening of the valves 49 is effected by any automatically displaced part of the machine such for example as a drum 42 (Figs. 1, 3, 11 and 12) upon which tappets 46 for operating the valves are preferably adjustably arranged.

The tappets 46 rotate cam wheels 47 with which cams 47$^x$ are connected, these cams acting upon levers 48 or the like. By rotating the levers 48 the valves 49 are depressed so that the pressure medium can flow through the valve passages 58 to the tool cylinders 1, 19, 26, and so forth. The drum 42 may be driven for example by means of a belt pulley 45 by means of a worm gear 43 43$^x$ the member 43$^x$ of which can be coupled with the drum 42 to be driven. The throwing-in and out of the coupling between the worm wheel 43 and the drum 42 can be effected by means of a pedal 44 which is connected by a rod with the axially displaceable drum 42.

The admission members (valves 49) for all the tools are preferably arranged side by side out of reach of the tools and are preferably combined in a valve chest 50 (Fig. 11) this valve chest being divided by partitions 51 into as many compartments as there are valves. The compartments can be placed in communication one with the other by openings 52 so that the supply of the pressure medium to all the valves can be effected through a single conduit 53 (Fig. 11). The pressure medium, such as compressed air, is advantageously supplied by a pump 55 connected with the machine frame and supplying air to the hollow machine column 56 which is formed as an air chamber. When one of the valves 49 is opened the compressed air enters the tool cylinder connected with this valve (at 57) and in the first place (at 54 in Fig. 4) into the cylinder 1 of the clamping device, thereby depressing the piston 2 and simultaneously rotating the yoke piece 4 with the jaw 5 over the last 6 and clamping the latter. By the reaction movement of the cylinder 1 in the upward direction the joint 8 is also fixed, as the lower half of the link bolt 11 is pressed against its upper half. Similarly, owing to the rotation of the grooved cylinder 42 the compressed air is supplied in a predetermined order through the other valves of the valve box 50 to the tool cylinders 19, 26, and so forth. When the pulling-over is to begin at the heel the stops 46 of the grooved cylinder 42 are adjusted in such a manner that after the last has been clamped the device serving for pulling the leather over the heel of the last, such as a pincers, a pusher or the like (not shown) becomes operative and draws the leather over the edge of the last.

In order to assist the pulling-over operation a tool 67 (Fig. 14) can be provided above the last and during the pulling-over depresses the last so that the leather can be more readily drawn over the latter. This tool may be formed by a pressure member 67 arranged on a piston 68 depressed by the pressure medium. When the leather has been pulled over it is fixed on the last by means of a tack driven by a suitably arranged hammer 25 (Fig. 1). Thereupon the valves for the cylinders of the pincer mechanisms 17 located at the toe or at the sides of the last are opened. Owing to the upward movement of the piston 20 thereby produced the pincer mechanism is first of all lifted and owing to the guidance of the piston rod in the angular groove 24 it is simultaneously given a rocking movement away from the toe of the last and back to the middle of the sole. The upper leather thereby arranged over the edge of the last is then fixed to the last by means of one or more tacks. The hammer cylinder 26 is connected with the pincer mechanism in such a manner that when this mechanism moves upward it likewise effects an upward movement. Two jaws 59 displaced shears-fashion are mounted on the lower side of the cylinder 26 (Figs. 9 and 13) and when the cylinder moves upward they are separated by a pin 63 (Fig. 9) in opposition to the action of a spring 61 (Fig. 9) so that the hammer 25 resting on the projections 60 of the jaws is released and falls owing to the action of the fluid medium upon the hammer piston. The pin and the hammer are returned under the influence of springs 61, 62 which are cocked owing to the downward movement of the hammer and of the pincers. When the grooved cylinder has effected a revolution, the valves 49 have again been closed, for example owing to stops 46 on the grooved cylinder 42 rotating the cam wheel 47 whereby the pressure member 47$^\times$ arranged on the same shaft is rotated in such a manner that the valve is able to move back and the compressed air issue through the openings 58. Each separate tool can be repeatedly thrown into or out of gear as desired during the running of the machine. In the construction here illustrated the tools are thrown into gear by rotating the member 47 for example by hand. The tools can be thrown out of gear owing to the fact that one of the members 47, 48 is made adjustable laterally. Owing to this lateral adjustability, the member 48 can be removed from the range of the member 47$^\times$, or of the valve 49, so as to interrupt the action of the member 48 upon the valve 49. Therefore, the tools can be thrown out of gear as stated. By displacing the stops 46 in the grooved cylinder the order in which the tools become operative can be modified as desired and determined in advance. By removing separate stops 46 the movement of separate tools can be entirely prevented.

Owing to the fact that each separate tool can be thrown out of gear independently the pulling-over machine can also be used as a lasting machine and adapted for the operation of lasting the leather. For this purpose it is only necessary to render inoperative all the tools except one pincer mechanism and a hammer, the leather being drawn over the last by the pincer mechanism and tacked to the inner sole resting on the last. Obviously in order to adapt the machine for other purposes some of the tools may be replaced by others without thereby altering the machine itself. The tools can also be relatively displaceable on the machine frame so that they are readily adjustable to different sizes of lasts. A safety valve 64 is provided for obtaining adjustment to the correct pressure, its weight being adjustable for the purpose of modifying the working pressure; a pressure gage 65 is provided on the air chamber for indicating the pressure. The tools are mounted on the column 12 out of reach of the driving gear and the tools are advantageously detachably connected with the column so that each tool can be readily adjusted and dismounted. The column can be made adjustable as to height so that the machine can be adapted to the operator. This adjustment can conveniently be effected by means of a screw 66. If the column is rotatably mounted the operation can be observed from every direction.

What I claim and desire to secure by Letters Patent of the United States is:—

1. A boot and shoe making machine comprising a plurality of fluid pressure actuated tools, a series of distributing members side by side in proximity to one another and at a distance from said tools, a supply of pressure fluid, connections between said pressure fluid supply and said distributing members, connections between said distributing members and said tools, and means to control said distributing members.

2. A boot and shoe making machine comprising a plurality of fluid pressure actuated tools, a valve chest at a distance from said tools, a series of distributing members side by side in said chest, a supply of pressure fluid, a connection between said pressure fluid supply and said valve chest, connections between said distributing members and said tools, and means to control said distributing members.

3. A boot and shoe making machine comprising a plurality of fluid pressure actuated tools, a valve chest at a distance from said tools, a series of distributing members side by side in said chest, a supply of pressure fluid, connections between said pressure fluid and said distributing members, connections between said distributing members and said tools, and means to control said distributing members.

4. A boot and shoe making machine comprising a plurality of fluid pressure actuated tools, a series of distributing members side by side and in proximity to one another and at a distance from said tools, a supply of pressure fluid, connections between said pressure fluid supply and said distributing members, connections between said distributing members and said tools, and automatic means to control said distributing members.

5. A boot and shoe making machine comprising a plurality of fluid pressure actuated tools, a valve chest at a distance from said tools, a series of distributing members side by side in said chest, a supply of pressure fluid, a connection between said pressure fluid supply and said valve chest, connections between said distributing members and said tools, and automatic means to control said distributing members.

6. A boot and shoe making machine comprising a plurality of fluid pressure actuated tools, a series of distributing members in proximity to one another and at a distance from said tools, a supply of pressure fluid, connections between said pressure fluid supply and said distributing members, connections between said distributing members and said tools, and combined automatic and manual means to control said distributing members.

7. A boot and shoe making machine comprising a plurality of fluid pressure actuated tools, a valve chest at a distance from said tools, a series of distributing members in said chest, a supply of pressure fluid, a connection between said pressure fluid supply and said valve chest, connections between said distributing members and said tools, and combined automatic and manual means to control said distributing members.

8. A boot and shoe making machine comprising a plurality of fluid pressure actuated tools, a valve chest, a series of compartments in said chest, a distributing member in each compartment, a supply of pressure fluid, a connection between said pressure fluid supply and valve chest, connections between said distributing members and said tools, and automatic means to control said distributing members.

9. A boot and shoe making machine comprising a plurality of fluid pressure actuated tools, a valve chest, a series of compartments in said chest, a distributing member in each compartment, a supply of pressure fluid, connections between said pressure fluid supply and said distributing members, connections between said distributing members and said tools, and automatic means to control said distributing members.

10. A boot and shoe making machine comprising a plurality of fluid pressure actuated tools, a valve chest, a series of compartments in said chest, a distributing member in each compartment, connections for the pressure fluid between each compartment, a supply of pressure fluid, a connection between said pressure fluid supply and said valve chest, connections between said distributing members and said tools, and automatic means to control said distributing members.

11. A boot and shoe machine comprising a column, a plurality of fluid pressure actuated tools on said column, a series of distributing members in proximity to one another and at a distance from said tools, a supply of pressure fluid, connections between said pressure fluid supply and said distributing members, connections between said distributing members and said tools, and means to control said distributing members.

12. A boot and shoe machine comprising an adjustable column, a plurality of fluid pressure actuated tools on said column, a series of distributing members in proximity to one another and at a distance from said tools, a supply of pressure fluid, connections between said pressure fluid supply and said distributing members, connections between said distributing members and said tools, and means to control said distributing members.

13. A boot and shoe machine comprising a plurality of fluid actuated tools, distributing members for said tools, mechanism for automatically operating said distributing members and provided with means for varying the order of operation of said tools, and means whereby said tools may be individually thrown out of or into operation as desired.

14. A boot and shoe machine comprising a plurality of fluid actuated tools, distributing members for said tools, mechanism for automatically operating said distributing members and provided with means for varying the order of operation of said tools, means for varying the time interval between the successive operations of the tools, and means whereby said tools may be individually thrown out of or into operation as desired.

15. A boot and shoe machine comprising a plurality of fluid actuated tools, distributing members for said tools, mechanism for automatically operating said distributing members and provided with means for varying the order of operation of said tools, and the time interval between the successive operations of the tools, and means whereby said tools may be individually thrown out of or into operation as desired.

16. A boot and shoe machine comprising a plurality of fluid actuated tools, distributing members for said tools, mechanism for automatically operating all of said distributing members and provided with means whereby said distributing members can be operated at will.

17. A boot and shoe machine comprising a plurality of fluid actuated tools, distributing members for said tools, mechanism for automatically operating all of said distributing members and provided with means whereby each of said distributing members can be manually operated.

18. A boot and shoe machine comprising a plurality of fluid actuated tools, distributing members for said tools, mechanism for automatically operating said distributing members and provided with means for varying the order of operation of said tools, and means whereby each of said distributing members can be manually operated.

19. A boot and shoe machine comprising a plurality of fluid actuated tools, distributing members for said tools, mechanism for automatically operating said distributing members and provided with means for varying the order of operation of said tools, means for varying the time interval between the successive operations of the tools, and means whereby each of said distributing members can be manually operated.

20. A boot and shoe machine comprising a plurality of fluid actuated tools, distributing members for said tools, mechanism for automatically operating said distributing members and provided with means for varying the order of operation of said tools, and means whereby each of said distributing members may be rendered incapable or capable of operation by the automatic mechanism.

21. A boot and shoe machine comprising a plurality of fluid actuated tools, distributing members for said tools, mechanism for automatically operating said distributing members and provided with means for varying the order of operation of said tools, and the time interval between the successive operations of the tools, and means whereby each of said distributing members may be rendered incapable or capable of operation by the automatic mechanism.

22. A boot and shoe machine comprising a plurality of fluid actuated tools, distributing members for said tools, mechanism for automatically operating said distributing members and provided with means for varying the order of operation of said tools, comprising a plurality of distributing member actuating parts, and means for adjusting said parts independently of one another.

23. A boot and shoe machine comprising a plurality of fluid actuated tools, distributing members for said tools, mechanism for automatically operating said distributing members and provided with means for varying the order of operation of said tools, comprising a plurality of distributing member actuating parts, means for adjusting said parts independently of one another, and means to render each of said parts inoperative to actuate a distributing member.

24. A boot and shoe machine comprising a plurality of fluid actuated tools, distributing members for said tools, mechanism for automatically operating said distributing members and provided with means for varying the order of operation of said tools, comprising a plurality of distributing member actuating parts, means for adjusting said parts independently of one another, and means whereby each of said distributing members can be manually operated.

25. A boot and shoe machine comprising a plurality of fluid actuated tools, distributing members for said tools, mechanism for automatically operating said distributing members and provided with means for varying the order of operation of said tools, comprising a plurality of distributing member actuating parts, means for adjusting said parts independently of one another, means to render each of said parts inoperative to actuate a distributing member, and means whereby each of said distributing members can be manually operated.

26. A boot and shoe machine comprising a plurality of fluid actuated tools, distributing members for said tools, mechanism for automatically operating said distributing members and provided with means for varying the order of operation of said tools, and means for varying the time interval between the successive operations of the tools, comprising a plurality of distributing member actuating parts, and means for adjusting said parts independently of one another.

27. A boot and shoe machine comprising a plurality of fluid actuated tools, distributing members for said tools, mechanism for automatically operating said distributing members and provided with means for varying the order of operation of said tools, and means for varying the time interval between the successive operations of the tools, comprising a plurality of distributing member actuating parts, means for adjusting said parts independently of one another, and means to render each of said parts inoperative to actuate a distributing member.

28. A boot and shoe machine comprising a plurality of fluid actuated tools, distributing members for said tools, mechanism for automatically operating said distributing members and provided with means for varying the order of operation of said tools, and means for varying the time interval between the successive operations of the tools, comprising a plurality of distributing member actuating parts, means for adjusting said parts independently of one another, and means whereby each of said distributing members can be manually operated.

29. A boot and shoe machine comprising a plurality of fluid actuated tools, distributing members for said tools, mechanism for automatically operating said distributing members and provided with means for varying the order of operation of said tools and means for varying the time interval between the successive operations of the tools, comprising a plurality of distributing member actuating parts, means for adjusting said parts independently of one another, means to render each of said parts inoperative to actuate a distributing member, and means whereby each of said distributing members can be manually operated.

30. A boot and shoe machine comprising a plurality of fluid actuated tools, distributing members for said tools, mechanism for automatically operating said distributing members and provided with means for varying the order of operation of said tools, comprising a plurality of distributing member actuating parts, means for adjusting said parts independently of one another and an automatically displaced machine member upon which said parts are adjustably mounted.

In testimony whereof I affix my signature in presence of two witnesses.

GEORGE PARMENTIER.

Witnesses:
    Hugo Reik,
    August Fugger.

---

Copies of this patent may be obtained for five cents each, by addressing the "Commissioner of Patents, Washington, D. C."